May 1, 1934.  J. J. NEUMAN ET AL  1,957,224
APPARATUS FOR CONVEYING SUGARS AND OTHER
GRANULAR OR COMMINUTED MATERIALS
Original Filed May 8, 1930  2 Sheets-Sheet 2

INVENTORS
J. J. Neuman and
BY H. G. Neuman,
C. F. Zoepel
their ATTORNEY

Patented May 1, 1934

1,957,224

UNITED STATES PATENT OFFICE 1,957,224

APPARATUS FOR CONVEYING SUGARS AND OTHER GRANULAR OR COMMINUTED MATERIALS

Jacob J. Neuman and Harry G. Neuman, New York, N. Y.

Original application May 8, 1930, Serial No. 450,668. Divided and this application February 23, 1933, Serial No. 658,070

4 Claims. (Cl. 302—59)

This invention relates to an apparatus for conveying sugars and other granular or comminuted materials.

It is the principal object of the invention to provide in combination with the receiving chamber for the dried sugar crystals, a simply constructed and reliably operating electrically actuated discharge gate or valve automatically controlled by the cumulative pressure influence of the sugar delivered to said chamber for moving said gate or valve to its open position to periodically discharge the dry sugar from said chamber.

With the above and other objects in view, the invention consists in the improved apparatus for conveying sugars or other granular materials, as will be hereinafter more fully described, illustrated in the accompanying drawings, and subsequently incorporated in the subjoined claims.

The subject matter of this application constitutes a division of the copending application, Serial No. 450,668, filed May 8, 1930, patented June 6, 1933, No. 1,912,910.

In the drawings, wherein we have illustrated a simple and practical embodiment of the apparatus, and in which similar reference characters designate corresponding parts throughout the several views,—

Figure 1:
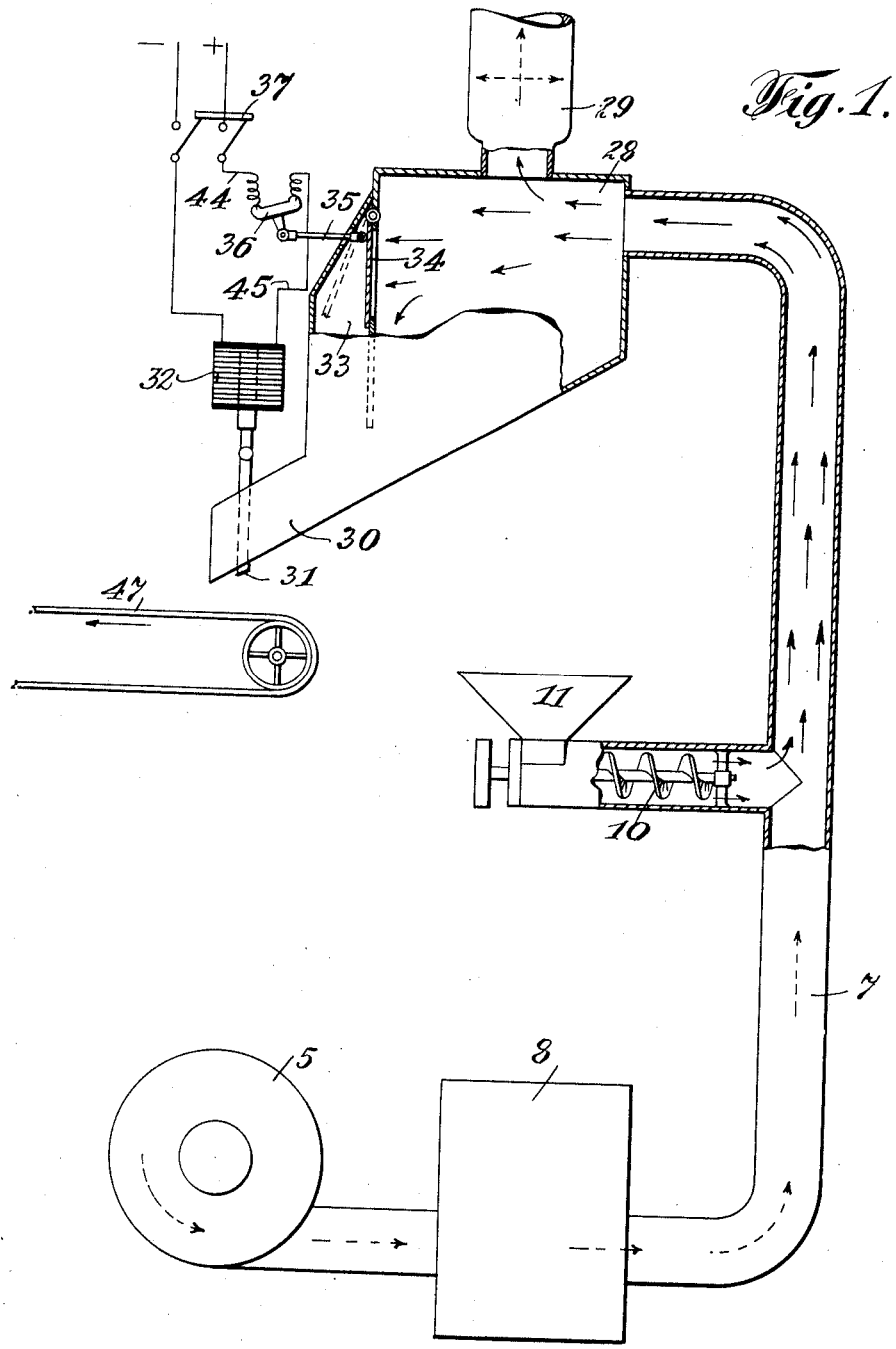
Figure 1 is a semi-diagrammatic view, with parts of the apparatus shown in section.

Referring in detail to the drawings, in Fig. 1 of the drawings, we have illustrated a form of apparatus for drying and conveying the sugar crystals in which the vertical conduit 7 is connected with the heater 8 and the blower 5, and the wet sugar is fed into the path of the heated air stream flowing upwardly through said conduit at a point substantially midway between its ends by the conveyer 10. In this case, the air pressure developed by the blower 5 is sufficiently great to carry the wet sugar in suspension upwardly through the conduit 7 and discharge the same from the laterally extended upper end of the conduit into the receiving chamber 28. During this conveyance of the sugar by the heated air stream, the moisture is substantially entirely evaporated so that the sugar crystals are discharged into the chamber 28 and in a substantially dry condition. However, we preferably make this chamber of cylindrical form so as to obtain a whirling or cyclone separating effect. The sugar finally settles in this receiving chamber while the air is exhausted therefrom through the filter bag shown at 29.

The sugar receiving chamber 28 is provided at its lower end and at the opposite end thereof from the connection with the conduit 7 with a downwardly inclined discharge outlet 30 which is normally closed by means of a vertically movable gate valve 31 connected with the core of the solenoid 32 to be operated to its open position when the solenoid is energized.

For the purpose of periodically and automatically closing the current supply circuit for the solenoid 32, we provide the chamber or container 28 for the dry sugar with a bypass shown at 33 communicating at its lower end with the inner end of the discharge outlet 30, and one wall of said bypass having an opening therein affording communication between the upper end of the bypass and the chamber 28. This opening is normally closed by the pivoted gate 34 and is operatively connected by means of the rod or link 35 with the movable element of a normally open switch generally indicated at 36.

Figure 2:
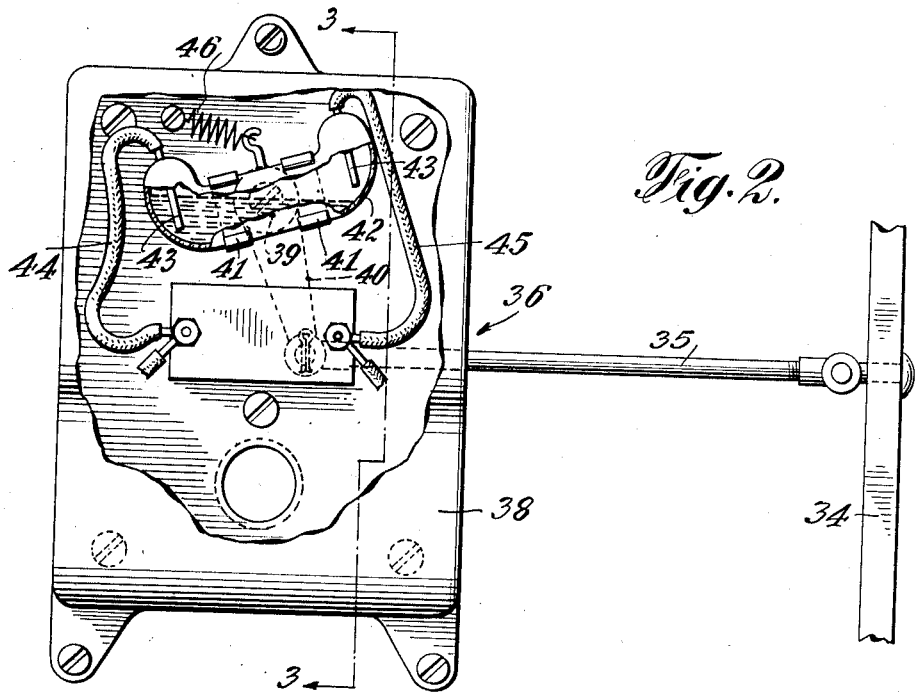
Fig. 2 is an elevation of the pressure operated mercury switch for controlling the operation of the sugar discharge gate or valve, a part of the switch housing being broken away and the mercury tube shown in section.
Figure 3:
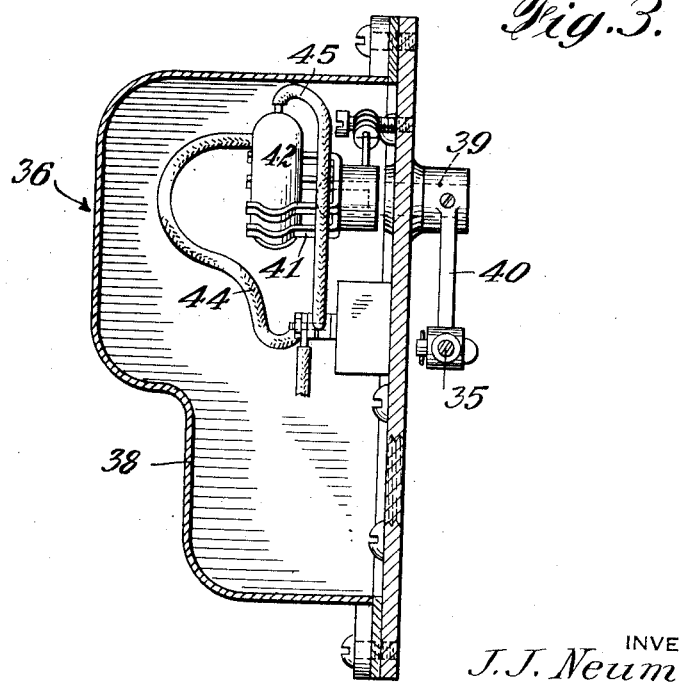
Fig. 3 is a sectional view taken substantially on the line 3—3 of Fig. 2.

Preferably we provide a mercury switch of the kind shown in Figs. 2 and 3 of the drawings, for the purpose of controlling the solenoid circuit. This switch is arranged in one of the current supply connections between the solenoid 32 and an ordinary double pole hand switch shown at 37 whereby the connections with the source of current supply may be established during the operation of the apparatus. Upon reference to Figs. 2 and 3, it will be seen that the several movable switch parts are enclosed within a suitable casing or housing 38. In one side wall of this housing a shaft 39 is rotatably mounted and has an arm 40 fixed to one of its ends externally of the switch housing to which the rod or link 35 is pivotally connected. To the inner end of said shaft, a suitable clamping device indicated at 41 for the mercury tube 42 is attached. Terminals 43 are sealed in the opposite ends of this tube and are connected by the conductors 44 and 45 respectively, with one of the poles of the switch 37 and one of the windings of the solenoid 32. The mercury containing tube 42 is held in a normal position by means of a coil spring 46 which also yieldingly resists movement of the pivoted gate from its normal closed position. As shown in Fig. 3 of the drawings, the tube 42 in its normal biased position maintains the mercury in the tube at such level that it is out of contact with one of the terminals 43. As the dry sugar gradually accumulates in the chamber or container 28, the pressure thereof against the inner side of the gate 34 gradually increases. When this pressure becomes sufficiently great to overcome the contractile pull of the spring 46, the gate 34 will be moved to the open position shown in dotted lines in Fig. 1 so that the dry sugar from the upper end of the chamber 28 will enter the bypass 33. In this opening movement of the gate, through the rod connection 35 therewith, the mercury tube 42 is oscillated so that the fluid mercury therein is caused to engage each of the terminals 43, thereby closing the circuit and energizing the solenoid 32, whereby the gate valve 31 is lifted to an open position. A portion of the contents of the chamber or container 28 is thus discharged through the outlet 30 upon a suitable conveyer indicated at 47 which carries the sugar to a desired point for further processing. Upon decrease of the pressure resistance of the sugar against the pivoted gate 34 to a point below the strength of the spring 46, the said spring will act to return the mercury tube and the gate 34 to their normal positions, thus breaking the circuit and de-energizing solenoid 32 so that the gate valve 31 moves to its closed position and thus cuts off further discharge of sugar from the outlet 30.

From the foregoing description considered in connection with the accompanying drawings, the several novel features of our present invention will be clearly and fully understood.

Also as herein disclosed, it will be appreciated that our purpose is accomplished by means of simple and inexpensive apparatus which will be highly reliable in the performance of its functions and require little care or attention in order to maintain the same at its highest operating efficiency. It will, however, be understood that the illustrated embodiment of the apparatus is more or less suggestive, and that in so far as the essential novel features of such apparatus are concerned, the same might be exemplified in various other structural forms. Therefore, it is to be understood that we reserve the privilege of adopting all such legitimate changes in the form, construction and relative arrangement of the various parts of the apparatus as may be fairly considered within the spirit and scope of the invention as claimed.

We claim:

1. In apparatus for handling granular materials, a receiving chamber for the material, material conveyer means discharging into said chamber, said chamber having a gravity flow outlet for the material, a normally closed valve for said outlet, an electro-magnet operatively connected with said valve and a circuit therefor, a switch in said circuit including an oscillatable mercury containing tube having terminals in its opposite ends connected with the respective sides of the circuit, a spring yieldingly holding said tube in a normally biased position and breaking the circuit between said terminals, a gate pivoted on one side wall of the receiving chamber and subject to the pressure of the accumulated material therein, and an operating connection between the gate and said oscillatable mercury tube whereby the latter is actuated upon movement of the gate under pressure of the material to close the circuit between the switch terminals and energize said magnet whereby the outlet valve is moved to open position.

2. In apparatus of the kind described, a material receiving chamber having an outlet for the material and a valve normally closing said outlet; a member mounted on one wall of the chamber and movably responsive to the pressure of the material therein, an electro-magnet operatively connected with said valve and a circuit therefor, a switch in said circuit and an oscillatable mercury-containing tube connected in said circuit, which tube is normally biased to break the circuit between its terminals and thereby hold the switch in open position, and operating means associated with said tube and said member to bodily oscillate the tube upon pressure responsive movement of said member to close the circuit between the terminals of the tube by mercury movement therein so as to effect closing of the switch circuit and energization of the magnet, whereby the outlet valve is moved to open position.

3. In apparatus of the kind described which includes a chamber with a valve controlling a gravity flow outlet and a pivoted gate adapted to be opened by pressure of granular material accumulating in the chamber, an electromagnet and its circuit controlling the opening of said valve, a mercury-containing tube the terminals of which are connected in said circuit, said tube being mounted for bodily oscillation, spring means normally holding said tube in such position that the mercury engages but one of its terminals and which holds said pivoted gate closed and in position for opening movement, said tube, spring means and gate so arranged that accumulating pressure of material against the gate will overcome the spring means and cause the tube to assume a position in which the mercury will engage both terminals, closing the circuit thereby and hence energizing the electromagnet for moving said valve to open position.

4. In apparatus of the kind described and in combination, a switch and its circuit including also therein an electromagnet and two terminals, a chamber wherein to accumulate granular material, having a gate pivoted for opening movement by the pressure thereon of the accumulating material and having also a discharge valve connected with the electromagnet for opening movement thereby, said valve controlling the discharge of material through an outlet from the chamber and said gate controlling the discharge of material from the chamber through a by-pass into the outlet, a mercury-containing tube containing said two terminals, mounted for bodily oscillation, a contractile spring holding said gate closed and in position for opening movement and also holding said tube in biased position with the mercury therein out of engagement with at least one terminal therein, and adapted to be overcome by accumulating pressure against the gate to provide for opening the gate and at the same time moving the tube so that both terminals within the latter will be engaged by the mercury to close the circuit and the switch and energize the electromagnet, opening the valve whereby to permit material discharge through the by-pass to the outlet simultaneously with the discharge of material through the outlet.

JACOB J. NEUMAN.
HARRY G. NEUMAN.